Figure 1:
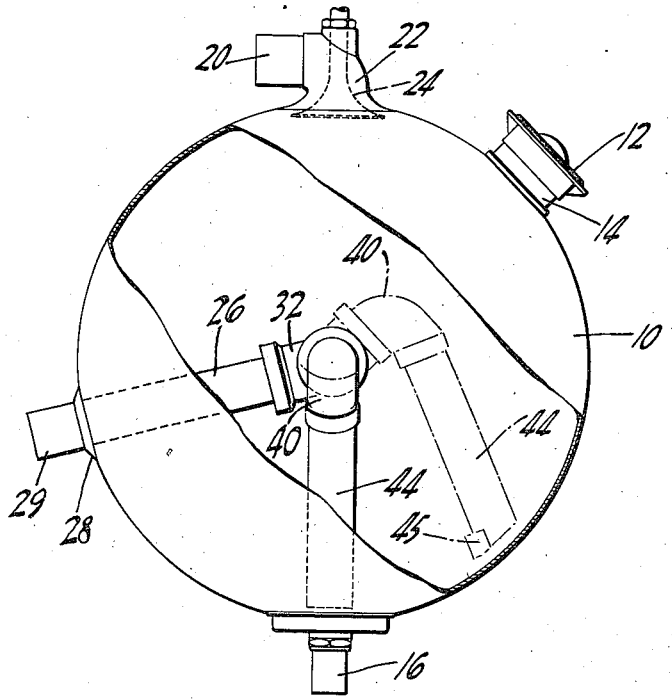

Feb. 18, 1947.    W. E. STINSON    2,415,972
AIRCRAFT LIQUID SUPPLY MEANS
Filed June 25, 1943

INVENTOR
WILLIAM E. STINSON
BY
Bean, Brooks, Buckley & Bean.
ATTORNEYS

Patented Feb. 18, 1947

2,415,972

UNITED STATES PATENT OFFICE 2,415,972

AIRCRAFT LIQUID SUPPLY MEANS

William E. Stinson, North Tonawanda, N. Y., assignor to Bell Aircraft Corporation, Buffalo, N. Y.

Application June 25, 1943, Serial No. 492,335

2 Claims. (Cl. 244—135)

This invention relates to aircraft, and more particularly to liquid reservoir and supply means such as are adapted to function as aircraft engine fuel or lubricating oil supply devices. More particularly, the invention relates to devices of the character described which are adapted to function in improved manner and without interruption in spite of tilting or rolling of the aircraft, as in connection with combat maneuvers thereof.

A prime object of the invention is to provide an improved combination liquid reservoir and outlet device in conjunction therewith which is adapted to deaerate the inflowing liquid and to automatically adjust itself to any change in attitude of the reservoir, whereby the outlet conduit thereof will at all times remain in communication with the body of liquid contained within the reservoir even though it might be of substantially depleted volume compared to the full capacity of the reservoir. Another object is to provide in a container of the character described an improved siphon-type liquid pickup device which is self-venting of air trapped therein during filling of the container. Another object of the invention is to provide a mechanism for the purpose referred to which is of improved structural simplicity and ruggedness. Other objects and advantages of the invention will appear from the specification hereinafter.

Figure 2:
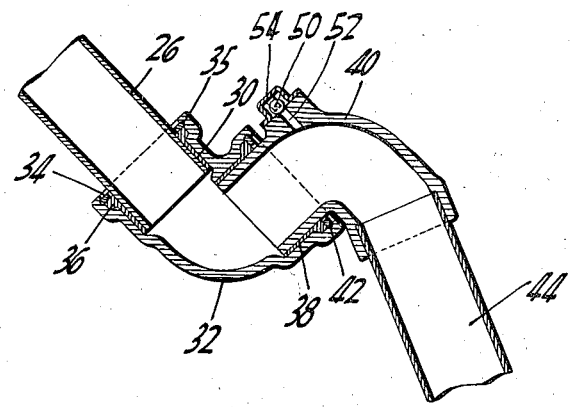

In the drawing:

Fig. 1 is an elevation of a reservoir of the invention with portions cut away to reveal the liquid pickup means; the latter being shown in different positions of adjustment; and Fig. 2 is a fragmentary section, on an enlarged scale, through the automatic adjustment bearing portion of the pickup means.

The invention is illustrated in the drawing in conjunction with a tank or reservoir 10 which is generally of spherical or spheroidal form, and such as is particularly adapted to be mounted upon a combat airplane or the like to function as a reservoir for lubricating oil to be circulated through the aircraft engine. A filler cap 12 is provided to detachably mount upon a nipple 14 extending from the casing, as by a screwthreaded or other suitable connection device. A sediment or cleanout drain outlet is provided at 16 for clearing of the reservoir as may be required.

The conduit system for circulating the oil of the reservoir to and from the aircraft engine comprises a pair of conduits arranged to connect to suitable inlet and outlet ports of the engine lubricating mechanism (not shown). It will be understood that the present invention is limited to the liquid reservoir and pickup means of the drawing, and that the mechanism of the invention is adapted to function in connection with any type of engine and engine lubricating system or other liquid circulation system which involves paired liquid inlet and outlet conduits. Therefore, in the case of the example selected herein to illustrate application of the invention, the oil outlet conduit of the engine lubricating system will be arranged in connection with the oil inlet port of the reservoir 10; and the oil inlet conduit of the engine lubricating system will be connected in open communication with the oil outlet portion of the reservoir.

The oil inlet port of the reservoir is illustrated at 20 to comprise a short nipple extending into open communication with an L-shaped chamber 22 formed at the top of the casing 10. A conically shaped shield is preferably installed as indicated at 24 to extend through the chamber 22 for dispersing the oil stream entering the reservoir 10 from the conduit 20, so that the oil sprays against the inner wall of the reservoir and drains downwardly therealong to join the body of liquid within the reservoir. If desired, the shield may also incorporate an air vent device, as by being bored to provide an open tube effect, to permit the tank to "breathe" in conjunction with surging of oil at different rates through the inlet-outlet connections. By disposing the lower flange of the shield 24 to be close to the reservoir inner wall, the inflowing liquid will be forced to fan out against the reservoir wall radially of the shield. This will result either in slowing of the rate of liquid movement or thinning of the layer of liquid travelling out and down the inside wall of the reservoir, whereby opportunity for the liquid to deaerate itself in improved manner will be presented.

The liquid pickup and outlet device of the invention comprises, as illustrated by the drawing, a conduit 26 formed of rigid metal or the like which is rigidly mounted upon the reservoir 10 by means of a flange connection 28 to extend through the wall of the reservoir and inwardly thereof to a position approximating centrally of the reservoir. At its outer end the conduit 26 is arranged to extend from the reservoir 10, as indicated at 29 for convenient connection to the engine inlet conduit of the engine lubricating system; and it will be understood that the end portion 29 may be threaded or otherwise provided to enable the engine oil intake conduit to be detachably connected thereto in any suitable manner.

At its inner end the conduit 26 carries locked thereon a bushing 30 which may be made of bronze or other suitable metal or bearing material. A pipe L of metal or the like as indicated at 32 is slipfitted at one end over the bushing 30, and a split metal ring 34 is snapped into position abutting the bushing 30 and into a grooved portion 35 of the L to lock the L in assembled position upon the conduit 26 without interfering with free rotation of the L upon the bushing 30 about the longitudinal axis of the conduit 26. The bushing 30 is shouldered at 36 to cooperate with the snap ring 34 for fixing the L against accidental displacement from the conduit 26 in directions longitudinally thereof.

At its opposite end the L is similarly formed to rotatably receive a bushing 38 which is locked upon one end of an elbow shaped conduit 40; a second snap ring 42 corresponding to the ring 34 being similarly arranged upon the L 32 to cooperate with the bushing 38 for locking the elbow 40 against axial displacement from the L 32 without interfering with free rotation of the elbow 40 upon its connection with the L 32. The elbow 40 may be conveniently formed to comprise a short casing or the like to be fitted with a tubular extension 44 which is so dimensioned longitudinally as to extend into close proximity with the wall of the reservoir 10; and the elbow-extension unit is so shaped as to provide a greater than 90 degree turn whereby the free end of the tube 44 is disposed to swing in a plane which is substantially coincident with the axis of the conduit 26 and normal to the axis of rotation of the elbow 40 relative to the L 32. The tube 44 is preferably fitted with a weight 45 at its extremity and at such position as to substantially center the mass of the pendular pickup device on the plane of rotation referred to. Hence, the weighted end portion of the tube 44 will at all times tend to swing straight downwardly from the bearing connections into close proximity with the inner wall portion of the reservoir 10 at whatever may be the bottom portion thereof irrespective of whatever tilting of the reservoir may take place. This is because the L 32 is always free to rotate about the inner end of the conduit 26, while the elbow 40 is free to rotate relative to the L 32 about an axis disposed at right angles to the axis of rotation of the L 32. The tube 44 is preferably fitted with a weight 45 at its extremity and at such position as to substantially center the mass of the pendular pickup device on the plane of rotation referred to.

Thus, for example, if the reservoir 10 be mounted upon an airplane so as to be normally disposed in an attitude illustrated by Fig. 1, the oil pickup tube 44 will naturally swing to the vertically disposed attitude thereof illustrated by solid lines in Fig. 1; the L devices 32—40 permitting this adjustment of the pickup tube by corresponding rotational adjustments thereof upon the bushings 30—39. If, however, the aircraft carrying the reservoir 10 be tilted, as in connection with a rolling or climbing or diving maneuver; in such manner, for example, that the oil inlet chamber portion 22 of the reservoir is rotated in clockwise direction away from the position of Fig. 1, the pickup tube 44 will automatically swing as to the broken line position thereof shown in Fig. 1, so that the pickup end of the tube 44 will be still directed into the gravity-determined bottom portion of the reservoir. Consequently, as the liquid within the reservoir assumes a correspondingly adjusted level, the pickup tube 44 will automatically follow the liquid, and will at all times remain immersed therein to the fullest possible extent, whereby optimum liquid pickup operation will be effected. Because of the fact that the bearings 30—39 are disposed at transverse axes, the pickup tube is thereby mounted so as to be universally swivable for optimum pickup performance, whether the reservoir 10 be tilted in the plane of the drawing as explained hereinabove or in directions transverse thereto.

By reason of the fact that the double elbow connection and support for the pickup tube 44 disposes the connected end of the latter in offset relation with respect to the fixed tube 26, it will be understood that the pickup tube 44 is thereby arranged to be freely swivable throughout substantially the entire range of the interior of the spherical tank 10. Naturally, the swinging tube 44 can never occupy the space within which the fixed tube 26 is located, but it is only to this limited extent that the pickup tube 44 is prevented from free swivelling throughout into registry with the entire inner surface of the tank 10. Whenever the pickup tube 44 tends to rotate against and beyond the fixed tube 26, it simply rolls around the tube 26 due to the action of the elbow bearings. Preferably, when the device of the invention is employed in aircraft, such as for an engine oil lubricating reservoir, the fixed tube 26 will be preferably so disposed as to extend in a direction as illustrated in Fig. 1, whereby to produce interference by the fixed tube 26 with free swinging of the pickup tube 44, it would require an almost impossible maneuver of the mounting aircraft: i. e., to dispose the airplane in a vertical forward slip. In any case, however, as explained hereinabove the pickup tube 44 will under all conditions roll freely around the fixed tube 26 subsequent to coming into interference therewith; so that for all practical purposes the pickup tube is free to swing at all times so as to be directed into the pool of liquid contained within the tank 10 irrespective of how high the level of liquid within the tank may be, and irrespective of the tilted attitude of the mounting vehicle.

Disposition of the fixed tube 26 so as to enter the tank 10 at a position which is normally below the elevation of the center of the tank, and to project therefrom to incline upwardly into connection at the center of the tank with the pickup tube 44 provides an arrangement which imposes the minimum allowable head in the conduit system leading from the pickup end of the tube 44 into the pump which is connected into an extension of the conduit piece 29 at any convenient location on the mounting aircraft. However, the arrangement of the liquid output conduit system just referred to disposes a "hump" in the system having its apex at the elbow 40. Consequently, whenever the tank 10 is being initially supplied with oil or the like the liquid will first flow into the bottom of the tank and then rise into the pickup tube 44. If the output tube extension 29 is then in connection with the engine lubricating system a body of air will be thereby trapped within the pickup tube device. To dispose of any such entrapped air I provide an automatic bleeder valve as indicated at 50 (Fig. 2) in conjunction with an aperture 52 extending through the apex wall portion of the elbow 40. The bleeder valve may comprise a one-way check valve, and as illustrated in Fig. 2 may comprise simply a metal ball disposed to normally seat upon the outer end of the aperture 52 and to be loosely maintained in operative position by means of a cage 54. Thus, pressure differentials at opposite sides of the ball 50 in favor of the interior of the elbow 40 will cause the ball 50 to unseat, thus allowing the entrapped air to escape from the pickup device. However, whenever the device is operating normally the pickup conduit system will be full of oil or whatever liquid is being handled, and the interior of the conduit system will be under somewhat reduced pressure relative to the exterior thereof due to the operation of the pump which is drawing liquid through the pickup device. Hence, the bleeder valve mechanism will normally remain closed, and will thus prevent sucking of air into the conduit system through the aperture 52.

It will be appreciated that the arrangement of the invention provides a positively guided pickup conduit which is locally rigid and therefore resistant to folding or other shortening actions, but which is universally swivable from centrally of the reservoir whereby the tube invariably follows gravity controlled movements of the liquid within the reservoir and extends at all times into closest possible proximity with the bottom portion of the reservoir wall. Thus, the possibility that the pickup tube might retract away from close proximity to the reservoir wall is obviated through use of a mechanical organization which is of utmost structural simplicity and ruggedness, and adapted to resist damaging influences in improved manner. This eliminates the need for carrying a large volume of liquid in the reservoir to insure continuous operation of the system; thereby saving weight and otherwise providing important improved features when used in connection with aircraft or the like.

Although only one form of the invention has been shown and described in detail, it will be apparent to those skilled in the art that the invention is not so limited but that various changes may be made therein without departing from the spirit of the invention or the scope of the appended claims.

What is claimed is:

1. A liquid supply means comprising a liquid container of curved wall form adapted to be mounted in fixed relation upon an aircraft so as to tilt therewith in connection with maneuvering of said aircraft, liquid inlet and outlet ports extending through wall portions of said reservoir, a liquid output device comprising a rigid conduit fixed to extend through said outlet port and from thence to a position substantially coincident with the center of the curve of said reservoir wall, an L-shaped conduit arranged in open communication at one end with the inner end portion of said fixed conduit and mounted thereon so as to be freely rotatable about the axis of said fixed conduit, a second L-shaped conduit mounted telescopically at one of its ends upon the other end of said first mentioned L conduit and freely rotatable thereon about an axis transverse to said longitudinal axis, the free end of said second mentioned L-shaped conduit being extended into close proximity with said curved reservoir wall portion at a position substantially in line with the plane of said fixed conduit while being free to sweep relative to the reservoir wall under the influences of the forces of gravity so as to be self-adjustable to extend downwardly toward the lowermost portion of said reservoir wall under all conditions of aircraft attitude adjustment, said second L-shaped conduit being formed with an air vent device at an uppermost wall portion thereof, said air vent device comprising a check valve adapted to open under pressure differentials in favor of the interior of said L-shaped conduit and to close under opposite pressure differentials.

2. A liquid supply system including a spherically shaped liquid reservoir and a liquid supply conduit arranged in open communication with the interior of said reservoir and to be operated under reduced pressure for withdrawing liquid from said reservoir, said reservoir including a stationary conduit connected to said liquid supply conduit and extending therefrom in an upward direction to a position centrally of said spherical reservoir, swivel conduit connection means carried by said stationary conduit at said central position, a liquid pickup conduit connected to said swivel connection means so as to suspend therefrom to reach downwardly into the body of liquid carried by said reservoir, and an air vent device in the form of a check valve carried by said swivel conduit connection means at approximately the apex thereof, said check valve being arranged to open in response to pressure differentials between the interior and the exterior of said swivel conduit means in favor of the interior thereof.

WILLIAM E. STINSON.

REFERENCES CITED

The following references are of record in the file of this patent:

UNITED STATES PATENTS

| Number | Name | Date |
|---|---|---|
| 1,735,784 | Olson | Nov. 12, 1929 |
| 2,285,973 | Hopkins | June 9, 1942 |
| 2,217,582 | White | Oct. 8, 1940 |
| 1,845,136 | Dieter | Feb. 16, 1932 |
| 1,871,055 | Hasbrouck | Aug. 9, 1932 |